April 28, 1936.  M. I. REACH  2,038,957
WASHING ARTICLE AND PROCESS OF PRODUCING SAME
Filed April 18, 1934
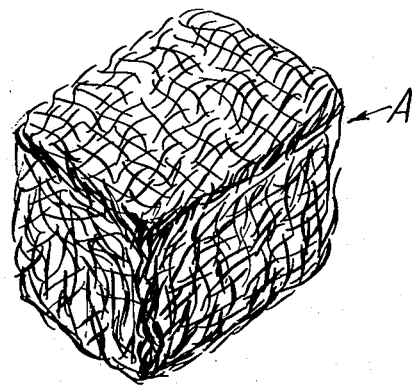
Inventor.
Minna I. Reach
By C―e D. Larrabee
Her Attorney.

Patented Apr. 28, 1936

2,038,957

UNITED STATES PATENT OFFICE 2,038,957

WASHING ARTICLE AND PROCESS OF PRODUCING SAME

Minna I. Reach, South Pasadena, Calif.

Application April 18, 1934, Serial No. 721,107

3 Claims. (Cl. 300—21)

My invention relates generally to articles for use in washing and scrubbing and more particularly to an article of such nature as may be employed in the manner of a swab or pad for the washing of toilet bowls and the like.

An object of my invention is to provide a novel washing swab structurally characterized by its extreme cheapness of manufacture enabling it to be discarded after a single use in view of its slight cost, and its capability of disintegrating in water while retaining its shape for a sufficient length of time to complete a single washing operation so that following the cleaning of a toilet bowl for example, the swab may be flushed from the bowl with the assurance that the swab will disintegrate within such space of time as not to clog the sewer pipe.

Another object of my invention is to provide a novel method by which the washing swab may be produced with ease and dispatch from extremely cheap materials and with unskilled labor.

Another object is to provide a novel swab of a disintegratable nature which will not immediately disintegrate upon its contact with water, but which will have its disintegration retarded for a sufficient period of time to accomplish its purpose and to thereafter immediately disintegrate in the water.

A further object of my invention is to provide a novel swab which when brought into contact with water will not immediately disintegrate, but which will retain its shape for a sufficient length of time to accomplish the washing operation for which it is constructed.

The invention includes the article and the method of producing the same.

Other objects, advantages and features of invention will appear from the accompanying subjoined detail description and the appended claims.

The accompanying drawing illustrates the invention in some of the forms I at present deem preferable.

The figure is a perspective view of a swab constructed in accordance with my invention.

In carrying my invention into practice I preferably use shredded paper or other comminuted material, which is readily disintegratable in water and which shredded paper at present may be obtained or produced at a very slight cost.

Such shredded paper is treated with a water soluble binder or adhesive of such strength and character that it will temporarily retard the disintegration of the shredded paper upon its contact with water and which will not leave a coating on the article being washed or a scum or oil on the water with which it is used.

The water soluble binder or adhesive I prefer to use with my invention is a weakened solution such as a twenty per cent (20%) solution of acacia or gum arabic, but it is understood that any other suitable water soluble binder or adhesive may be used such as silicate of soda, the various vegetable gums, gum karaya, tragacanth, dextrin or British gum; adhesives made from glues, starches and cereals; adhesives of either vegetable or animal matters, or such adhesives made from materials that act as an adhesive and are readily soluble in water, gelatines, albumin, agar, and sugar derivatives may be suitable; as well as chemical salts which act as an adhesive and are easily fusible and water soluble. The only requirement of the chemical used is that it be of such character and strength as to act to bind the shredded paper in a wadded mass and retard the disintegration of such shredded paper for a short space of time until the washing operation has been completed and which chemical in the strength used will also be readily soluble in water and will not leave a scum or oil on the article being washed or on the water with which it is used.

After a solution of a chemical as above indicated, say for example a twenty per cent (20%) solution of gum arabic, has been prepared a mass of shredded paper of sufficient quantity for a single swab of the desired size is immersed in such solution and immediately withdrawn therefrom and following which the treated mass is compressed, as by the hand, to the desired form, mold, or wadded into a compact body A of the desired shape and size; the resultant article or swab A is then permitted to dry after which it is ready for use.

I have found in practice that a solution of gum arabic of the above strength has the desirable properties of temporarily retarding disintegration of the shredded paper upon its contact with water and also such solution of gum arabic will hold the swab in shape for a sufficient period of time to enable the swab to be sufficiently employed in scrubbing or washing an article, particularly a toilet bowl. Such solution of gum arabic upon its contact with water will ultimately dissolve therein and thereby liberate the shreds of disintegratable paper from the wadded form, and will not form a coating on the porcelain surface of the toilet bowl or produce or leave a scum or oil on the water in the bowl.

From the foregoing it will be apparent that a paper swab of this character may be produced very cheaply so as to enable the same to be discarded following a cleaning therewith of a toilet bowl.

The swab A may be used in conjunction with any suitable holder such as a tong (not shown) and thereby eliminate the undesirability of the swab being used with the hand of the operator. The swab, after being used in cleaning a toilet bowl may be flushed into the sewer drain by the usual toilet flushing operation where it will readily disintegrate without likelihood of clogging the drain.

A swab embodying my invention will eliminate the present undesirable use of a permanent brush in the cleaning of toilet bowls and which it particularly objectionable in that the brush must be cleaned following each use in order that it remain sanitary and must usually be carried from the bathroom through other parts of the home or building to a place of storage after use of the swab in cleaning a toilet bowl.

If desired the solution of water soluble binder or adhesive may be scented to provide for a pleasant odor when in use.

I have also discovered that the finished article may be made more pliable or flexible for immediate use as a swab for washing articles with water that may be accomplished by adding approximately one part of vegetable oil, such as castor oil, to eight parts of the water soluble binder and adhesive hereinbefore referred to, such as the twenty per cent solution of gum arabic thereby forming an emulsion into which the shredded paper is immersed, or associated with, in either manner hereinabove referred to.

I claim:

1. The process of producing a washing article from shredded paper which comprises treating a mass of the paper with an adhesive and binder more slowly soluble than the shredded paper, and of sufficient strength to temporarily retard disintegration of the paper in water and retain the article in its formed shape; and then forming the treated mass into a relatively compact body which when dry may be used in the manner of a swab or pad for cleaning purposes.

2. The process of producing a washing article from shredded paper which comprises immersing a mass of the paper in a weak solution of gum arabic of approximately twenty percent; and then forming the treated mass into a relatively compact body which when dry may be used in the manner of a swab or pad for cleaning purposes.

3. An article of manufacture comprising a body of shredded material readily disintegratable in water and impregnated with a non-oily substance more slowly soluble than the shredded material for retarding disintegration of the body and temporarily retaining the latter in its shape when brought in contact with water, whereby to temporarily prolong the life of the body when used as a swab or pad in a washing operation.

MINNA I. REACH.